April 9, 1935. W. M. HIBBS 1,996,764
PROCESS FOR THE PRODUCTION AND PURIFICATION OF SULPHUR DIOXIDE
Filed April 4, 1933
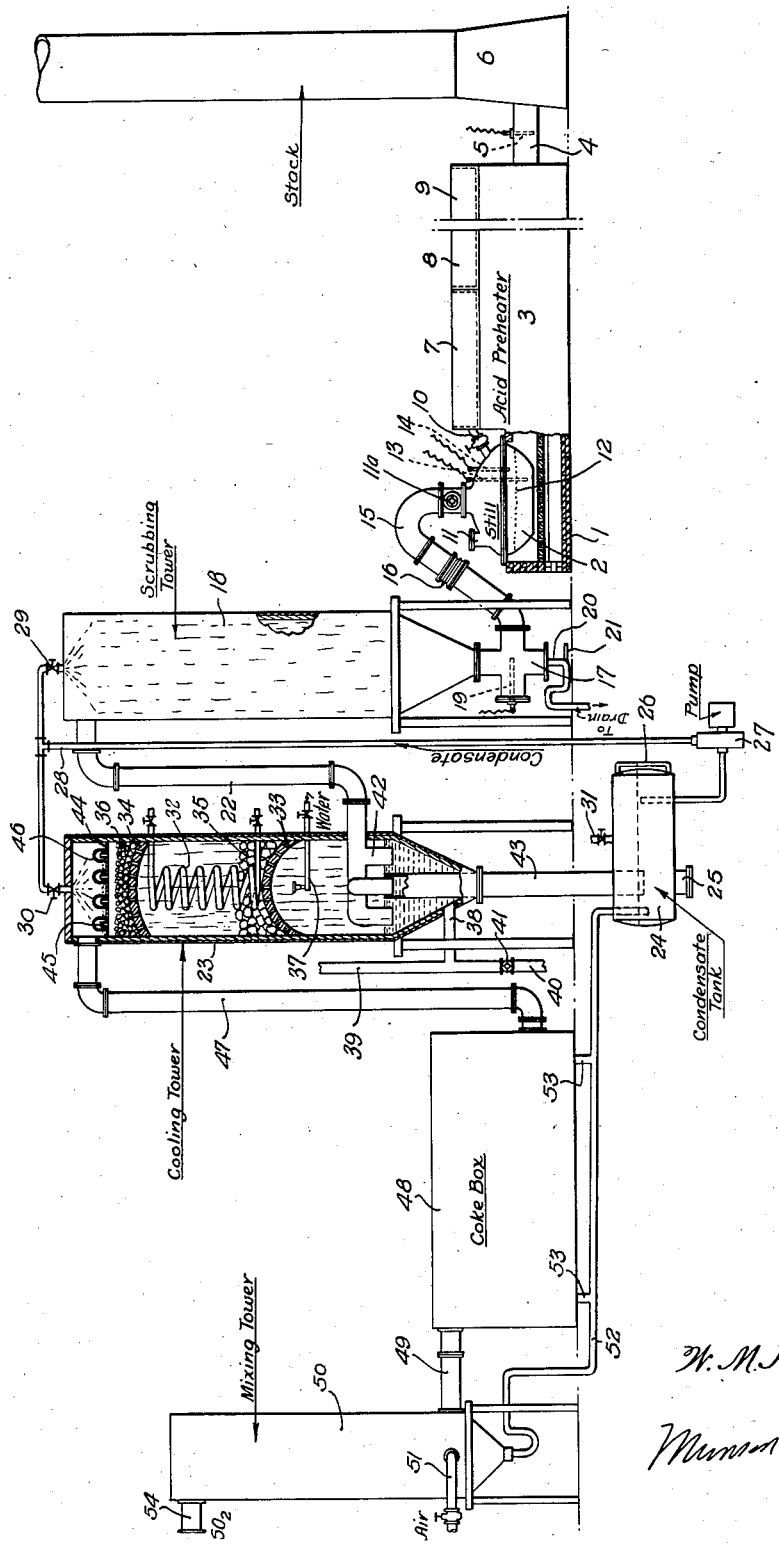

Patented Apr. 9, 1935

1,996,764

UNITED STATES PATENT OFFICE 1,996,764

PROCESS FOR THE PRODUCTION AND PURIFICATION OF SULPHUR DIOXIDE

William Morris Hibbs, Wilmington, N. C.

Application April 4, 1933, Serial No. 664,415

7 Claims. (Cl. 23—177)

The invention relates generally to the production of sulphur dioxide which in turn may be converted into sulphuric acid, and more particularly to the production of sulphur dioxide by the treatment of weak or spent acids which have been separated from the original sludge, by heating such weak acids with a quantity of carbon, the supply of which may be replenished from time to time as required for the replacement of the carbon lost in the reaction.

The process relates especially to the production of a sulphur dioxide from which may be produced a water-white, commercially pure sulphuric acid from sludge, spent or waste sulphuric acid which has been previously separated from the original sludge and which has a concentration of from 20 to 48° Bé., depending on the origin of the original sludge and method employed in separation.

Heretofore it has been concentrated either by direct or indirect heat to a maximum concentration of 66° Bé. Higher concentration by these methods was impossible due to the decomposition of the acid at high temperature by the impurities present, chiefly carbonaceous material.

In view of the ever increasing demand for sulphuric acid of a strength above 66° Bé., and of sufficient purity to permit of its use in the various industries, huge sums of money have been spent for research in an endeavor to produce a cheaper and purer acid from sludge, spent or waste acid.

Methods have been developed whereby the sludge, spent or waste acid has been decomposed by heat with the formation of sulphur dioxide. This decomposition product was to be reoxidized by suitable means to form sulphuric acid. By no known previously developed method, however, has a continuous operation been offered the manufacturer or has any method thus far disclosed provided for a complete decomposition of the acid in the event insufficient carbonaceous material was contained in the separated, spent, sludge or waste acid.

For years it has been known that sludge or spent sulphuric acids high in carbon could be decomposed by heat with the liberation of sulphur dioxide ($SO_2$). As early as the year 1899 processes were developed covering the manufacture of sulphuric acid from oil refinery sludge. The process as then described was based on the fact that when heated, oil refinery sludge decomposed, liberating water and sulphur dioxide. The sulphur dioxide was passed over a catalyst where conversion into sulphur trioxide was accomplished. This was absorbed by sulphuric acid, just as in the usual contact sulphuric acid plants. In all such prior processes the operation has depended on the carbon or carbonaceous material in the sludge acid for the decomposition of the sulphuric acid; no provision whatever having been made to care for acids too low in carbon for such decomposition reactions.

By the proposed method only has it been possible to completely decompose all of any spent, sludge or waste acid (sulphuric) of any degree Bé. from 20° up in a continuous operation without fear of distillation of sulphuric acid and not as sulphur dioxide, the desired product of decomposition.

The present process deals primarily with weak acids or with acids which have been separated from the original sludge, the strength of which acids varies ordinarily from 20° to 48° Bé., and up to the present time has had a maximum concentration of 66° Bé., by any known method employed.

Spent sludge or waste acids of low carbon content are found in the explosives industry, and while the invention is not limited to the treatment of this class of material, the invention is intended to take care of spent acids heretofore concentrated to a maximum of 66° Bé., by either direct or indirect heat.

Due to the variation of the percentage of carbon in various separated, spent, sludge or waste acids, it has heretofore been impossible to govern the rate of decomposition of such acids by heat, either direct or indirect. Due also to the varying carbon content of such acid, it has been impossible to accomplish complete decomposition without danger of distillation of sulphuric acid which has not reacted with the carbon present. The inability to govern the rate of decomposition and the distillation of sulphuric acid which was lost in the purification process, combined with the necessity for a continuous operating cycle, has been overcome by the proposed method as herein described.

A definite minimum ratio of carbon to acid must be maintained at all times if complete decomposition of the sludge, spent or waste acid is to progress uninterrupted without distillation of sulphuric acid.

In order to maintain a continuous operation with a definite minimum ratio of carbon to acid, I have perfected a method which, by the aid of a decomposition chamber where there is at all times an excess of carbon present, thus assures complete decomposition of the separated, spent, sludge or waste acid without fear of distilling off any of the sulphuric acid which would result in lower yields and increased operating costs.

According to my process, it is proposed to decompose such weak separated sludge or spent acids, by means of heat in the presence of excess carbon, the temperatures and the proportions of the reacting materials being so regulated that all sulphuric acid or sulphuric acid compounds contained in such acids will be liberated in the form of sulphur dioxide ($SO_2$). This method has been developed and perfected with the idea of utilizing weak acids such as sludge or spent acids in the manufacture of either chamber acid or contact sulphuric acid. The purity from carbon contamination of such acid as is produced by the present process depends largely on the fact that preferably no agitation is employed during decomposition. Thus there is avoided the excessive volume of carbon dust consequent upon agitation which in other processes has to be either scrubbed from the gases or burned.

The fact that previously separated sludge or spent acids are used in the process is of vital importance when considering the purification necessary for producing a commercial acid of high purity. The removal of volatile hydrocarbons, tars and alcohols by previous separation enables the production of an acid of high purity at much lower cost than could otherwise be obtained without the necessity of elaborate purification equipment. In view of the class of acids herein referred to being too low in carbon to decompose by heat without distilling off most of the available sulphuric acid as acid rather than as sulphur dioxide, the importance of adding the spent acids to a mixture sufficiently high in carbon to promote rapid decomposition becomes apparent. Periodic additions of carbon to the decomposing mixture are necessary for the replacement of carbon lost in the reaction.

Previous to the development of the present process, all separated sludge or spent acids of low carbon content have been concentrated either by direct or indirect heat. The maximum concentration obtainable by these methods was 66° Bé. or 93.19% $H_2SO_4$. By the present process, however, direct concentration of the separated sludge or spent acids is not attempted. On the contrary, these acids are decomposed by means of excess carbon and heat as herein described. Heretofore, so far as I am aware, no one has attempted to add weak separated sulphuric acid to a mixture of carbon and acid, which mixture is already in a state of decomposition.

Continued experiments have demonstrated the fact that when sulphuric acid and carbon are heated to temperatures between 235° and 260° C., and preferably between 250° and 260° C., decomposition of the sulphuric acid takes place with the formation of sulphur dioxide and water. In the present process advantage is taken of this reaction by adding separated sludge or spent sulphuric acid to a large excess of carbon which is already heated to the desired temperature and is thoroughly saturated with acid sufficiently concentrated to react with the carbon, thus producing the desired decomposition. Addition of carbon to the decomposing mixture may be necessary for replacement of carbon lost in the reaction plus slight mechanical losses.

My experiments have further demonstrated the fact that the desired concentration necessary for this reaction can be maintained by accurate temperature control while the continuous incoming spent or sludge acid is constantly liberating its water and replacing the decomposing acid so that a continuous operation is maintained.

By controlling the temperature and volume of the incoming acid, it has been demonstrated that it is possible to successfully recover all available sulphuric acid as sulphur dioxide without having to contend with the distillation of sulphuric acid. When the present cost of recovered acid concentrated by all ordinary methods is considered, the water balance alone is a large factor in estimating storage requirements, and the saving in the cost of storage tanks, labor, acid yields, etc. effected by the present process, which eliminates the necessity for dealing with 66° Bé. acid when a concentrated acid of a strength equal to 109% $H_2SO_4$ is desired, will be apparent.

The gaseous products of decomposition pass over to a scrubbing and cooling system where water vapors from the reaction are condensed and then recirculated over the scrubbing and cooling towers for the purpose of removing any particles of carbon carried over mechanically by the products of decomposition. The heat of the incoming gas is sufficient to liberate the sulphur dioxide from the scrubbing water, thus permitting the excess water to pass to a drain free from acid or acid forming compounds. The number of cooling and scrubbing towers used may be varied, depending on conditions encountered.

A distinct advantage offered by the preferred process wherein indirect heat is employed is the almost complete absence of carbon dust as well as other impurities encountered when unseparated sludge or spent sulphuric acid is decomposed by heat for the purpose of producing concentrated sulphuric acid. Additional advantages offered are:—low initial cost of construction and subsequent operation; the total absence of mechanical agitation or other moving equipment with the exception of a small pump for the purpose of circulating the condensed water for purification purposes and possibly a small oil circulating pump, if fuel oil is used as a medium of heat; and the high power cost customarily encountered is entirely absent in the proposed process.

While indirect heating is preferred, since it requires less complicated and elaborate purification treatment, nevertheless direct heat may be employed if desired, without departing from the spirit of the invention in its broadest aspects. Thus for direct heating, hot air either direct from the combustion of oil or gas, or air previously preheated but free from other products of combustion, may be employed to supply the necessary heat for the reaction. The direct heating process is somewhat more economical from the standpoint of fuel consumption, but on account of the agitation involved the gas may under certain conditions carry over with it some finely divided carbon which can be removed only with some difficulty. Direct heating by hot air or waste gases also reduces the concentration of the gas.

After the decomposition of the weak acids into sulphur dioxide, the gas may be purified and then reoxidized by a catalyst into sulphur trioxide. The trioxide may then be absorbed in the same manner customarily employed in contact plants for conversion into sulphuric acid. In case the chamber method is employed, the dioxide would preferably be oxidized by the oxides of nitrogen derived either from the potting of sodium nitrate or from an ammonia oxidation process.

Referring to the drawing, the numeral 1 denotes a gas or oil burning furnace composed preferably of brick and provided with a checker arch. The hot gases from the furnace pass up through the arch and around a decomposition chamber or still 2 and thence through a brick-walled acid preheating chamber 3 and through a flue 4 provided with a pyrometer 5 to a stack 6.

A plurality of lead pans 7, 8 and 9 heated by the waste gases from the furnace 1 serve to preheat the weak or spent acid employed in the process, which is preferably an acid separated from the original sludge and having a strength varying from 20° to 48° Bé. A lead pipe 10 provided with a suitable control valve serves to admit the weak acids to the decomposing chamber 2 in regulated quantities as required.

The decomposing chamber or still 2 is suitably supported within the upper portion of the furnace 1 and is preferably composed of cast iron having the proper carbon content to resist corrosion by strong acids. Within this still the materials undergoing heat treatment, namely the acid and carbon, react. An opening 11 is provided at the upper portion of the still for adding carbon as needed. This opening is preferably trapped by a damper (not shown) so that the carbon may be added without admitting excess air. The carbon and acid fill the still to the level 12 indicated in the drawing. A valve controlled inlet 11a may be provided at the upper portion of the still for supplying a regulated quantity of air to the decomposition chamber. A pyrometer 13 located near the bottom of the decomposition chamber serves to indicate the temperature of the mixture of carbon and acid. A change in temperature at this point indicates that either an excess or an insufficient quantity of acid is being added. This pyrometer will, of course, indicate any changes in temperature of the acid and carbon mixture due either to changes in the quantity or strength of the added acid and will also indicate whether the proper degree of heat is being received from the furnace. Another pyrometer 14 is located within the space above that occupied by the acid and carbon mixture and is affected only by the temperature of the gas arising from the mixture in the bottom of the decomposition chamber or still.

Leading from the still 2 is a flue or fume line 15, preferably of lead, having a bellows expansion joint 16 therein. The line 15 communicates with a lead or lead-lined cross 17. From the lower arm of the cross there extends a waste pipe 20 leading to a drain, through which pipe fresh water may be forced from line 21 when it is desired to flush the drain pipe. A pyrometer 19 is located in the arm opposite the fume line 15 and serves to indicate the temperature of the gases at this portion of the apparatus.

A gas line 22 leads from the scrubber tower 18 to a cooling tower 23, which will be more fully described hereinafter. Two or more of these towers may be employed if desired. From the bottom of the tower 23 condensate passes to a lead-lined condensate tank 24, which may be provided with a suitable clean-out hole 25 and with a sight glass 26 for observing the level of the liquid in the condensate tank. A motor operated pump 27 may be employed for circulating condensate drawn from the tank 24 through a pipe 28 having branches entering the tops of towers 18 and 23, which branches are controlled by valves 29 and 30 respectively. The condensate tank 24 is preferably provided with a valve controlled air vent line 31 leading from the top thereof.

Referring more in detail to the cooling tower 23, this is preferably steel jacketed and lead lined, as is also the scrubbing tower 18. A lead coil or coils 32 containing a cooling fluid is shown located between a pair of hard lead or masonry arches 33 and 34. Relatively large sized particles of coke or quartz mounted upon the lower arch 33 provide a packing 35, while smaller particles upon the upper arch 34 provide a fine screen or packing 36. A large number of arches and screens may be employed if desired. A valve controlled pipe 37 may be provided beneath the lower arch 33 for supplying water in regulated amounts when this is necessary in addition to the recirculated condensate admitted at the top of the tower. The condensate accumulates in the conical bottom of the tower and the gas entering the tower from the fume line 22 is admitted through a plurality of outlets 42 forming branches of the pipe 22 and dipping slightly below the surface of the condensate in the bottom of the tower. The level of the condensate may be governed by vertically adjusting the pipe 43 leading to the condensate tank 24. From the bottom of the cone a pipe 38 leads to an air vent pipe 39 and drain 40, the latter being controlled by a valve 41.

The gases entering the cooling tower 23 from the fume line 22 pass first through the condensate accumulated in the bottom of the tower, this providing a direct heat exchange between the hot gases and the condensate. They then pass upwardly in counter-current to the circulated condensate entering from the top of the tower, which condensate may be amplified by fresh water from the pipe 37. The gases then pass successively through the filters or packing 35 and 36, and thence into the upper portion of the tower through a perforated hard lead plate 44 located above the top layer of quartz or coke. This plate is provided with lead nipples 45 rising above the level of the plate, as indicated in the drawing. The plate 44 is preferably burned to the lead lining of the tower so that neither gas nor condensate may pass except through the lead nipples 45. These nipples serve to regulate the depth of the condensate on the top of the plate and also act as distributors for the condensate entering the lower section.

As shown, heavy lead cups 46 are inverted over the nipples 45. The lower edge of each cup is irregular so that gas passing up through the nipples must pass downward through the condensate before leaving the cup. This acts to reduce the amount of spray carried over and also provides a final cooling medium. Any desired number of such spray catchers may be employed.

From the cooling tower 23 the fumes pass through a gas line 47 to a coke box 48 which acts as a spray catcher. Here any mist which may be carried over from the cooling tower 23 is removed. One, two or more of such coke boxes may be employed, depending on the conditions encountered. The coke box is preferably of wooden construction, with lead lining. From the coke box 48 the fumes pass through a pipe 49 to a mixing tower 50, where additional air may be admitted through a valve controlled pipe 51 in order to reduce the concentration of the $SO_2$ gas to any desired percentage. The tower 50 is preferably steel jacketed, lead lined, and packed with quartz or coke. A lead drain pipe 52 leads from the bottom of the mixing tower 50 to condensate tank 24. Branches 53 lead from the coke box to the drain pipe 52, which dips below the level of the condensate in tank 24. The flow through this pipe and into the condensate tank is by gravity, the level of the tank 24 being sufficiently low for this purpose.

The sulphur dioxide gases, diluted to the desired extent with air, pass from the upper end of the mixing tower 50 through a pipe 54 to a place of storage or use, or for further treatment, and may be reoxidized by means of a catalyst into sulphur trioxide which may then be absorbed in the customary manner in contact plants for conversion into sulphuric acid.

It will be understood that the plant as herein described operates under a suitable degree of vacuum, but as it is intended for use in conjunction with a contact or chamber plant, no separate means for exhausting the fumes is herein shown, it being intended that the equipment customarily employed in the contact or chamber plant shall be utilized.

It will also be understood that the operation of the present apparatus is not limited to the use of one still or decomposition chamber. One, two, or as many as required may be employed. Where more than one still is used, two or more such stills may discharge into a common header leading to the scrubbing tower 18.

My experiments have shown that complete decomposition of the sulphuric acid to sulphur dioxide does not occur if the ratio of carbon to acid is less than one part carbon to two parts $H_2SO_4$ in molecular ratio. Expressed in terms of percentage, the ratio of carbon to acid is 5.7692% carbon to 94.2308% $H_2SO_4$, or a molecular ratio of 1 to 2.

Consequently in operating my process the still 2 contains a mixture of carbon and concentrated sulphuric acid, there being maintained at all times an excess of 1 part (molecular) carbon to two parts (molecular) $H_2SO_4$. The mixture is continuously maintained at about the level 12 by the addition of acid through the pipe 10 from the acid preheaters to compensate for the gases passing off through pipe 15, the carbon supply being replenished from time to time through the opening 11 as required to maintain the necessary excess.

The acid supplied to the preheating pans 7, 8 and 9 is a weak acid which has been separated from the original sludge and has a concentration of from 20° to 48° Bé., depending on the origin of the original sludge and the method employed in separation. This weak acid is progressively heated by the hot fumes from the furnace 1 on their way to the stack, the portion which enters the still through the pipe 10 having been preferably heated to 150–175° C., depending on the type of separated acid used.

The concentration of the weak acid as added to the still is considerably below the point where it will react at once with the carbon present, and consequently the quantity of weak acid added must be accurately controlled so that just sufficient acid is added to replace the acid reduced by the carbon. The weak acid, in coming in contact with the large volume of concentrated acid in the still, is quickly mixed and the water content thereof vaporized, distilling off along with the sulphur dioxide gas produced by the reaction of the concentrated acid and carbon in the still under the proper temperature conditions. The resulting products of decomposition pass off in vapor and gaseous state to the purification system. A continuous and uniform operation of the process is therefore dependent on the rate at which weak acid is added to the still, the temperature maintained in the still, and the ratio of carbon to acid present. The amount of acid added is governed by the temperature of the mixture as indicated by the pyrometer 13, unless the pyrometer 14 indicates a change in the strength of the acid added.

Thus it will be observed that accurate control and uniformity of temperature are absolutely necessary for successful continuous operation. Any wide variation in temperature affects directly the rate of decomposition of the acid. Experience has shown that at 250–260° C. decomposition progresses at a uniform rate, although some variation from these limits is permissible without departing from the invention. By means of the two pyrometers 13 and 14 it is possible to maintain accurate temperature control of the contents of the still 2. Pyrometer 13, located near the bottom of the still, indicates any change in quantity of acid added after the burner (either gas or oil) which heats the furnace has been adjusted to the operating conditions. Any change in temperature recorded by this pyrometer indicates a variation in quantity of acid added or amount of fuel consumed. Another pyrometer (not shown) serves as a control for the temperature of the furnace.

Pyrometer 14 is located above the mixture of acid and carbon and is affected only by the temperature of the products of decomposition. Any change in strength of acid added or any distillation of acid due to insufficient carbon will be instantly indicated by this pyrometer.

Ordinarily from 5 to 10% of the total air required for dilution of the $SO_2$ gas is admitted at the still or decomposition chamber through valve controlled opening 11a. A differential gauge (not shown) is preferably attached to inlet line 11a behind the valve. By means of such a gauge a close control of air entering at this point may be maintained. The remaining quantity of air required to reduce the concentration of the $SO_2$ gas to the desired percentage is introduced into the system in the mixing tower 50 through the valve controlled pipe 51.

The pyrometer 19 indicates the temperature of the gaseous mixture entering the scrubbing tower. Best results are obtained when gases enter this point at approximately 95° to 98° C. In summer it may be necessary to spray water on the lead line 15 from the still 2 to the scrubber 18, while in winter this line may need insulation in order to maintain approximately these temperatures.

The temperatures of the gas leaving the scrubber will be approximately 55° to 60° C., while at the exit of the cooling tower they should be approximately 20° C.

The coke box or spray catcher may if necessary contain lead cooling coils if additional cooling is found necessary in order to secure a gas of not in excess of 20° C. for the entrance to the mixing tower.

Purification of the sulphur dioxide gas is accomplished by passing the gas counter-current to the spray of the condensate entering the towers 18 and 23 through the valves 29 and 30. The condensate from the cooling tower and spray catcher may in warm weather be cooled by any appropriate means before recirculation over the scrubbing and cooling towers. That portion of the condensate delivered to the scrubbing tower cools and scrubs the incoming gas, then passes directly to the drain as all sulphur dioxide gas has been removed by heat in the lower zone of the scrubber. Water will not absorb or retain sulphur dioxide in solution at the temperature of the incoming gases. The bottom portion of the scrubber 18 is a hot zone where the heat from the incoming gas releases from the condensate all sulphur dioxide which may have been previously absorbed in the upper or cooler zone, or any which the condensate carried over from the cooling tower.

The chief function of the cooling tower is the removal of as much moisture as possible without added cost of operating. Cooling is accomplished by both direct and surface cooling, and the major portion of the spray carried along by the gas is removed by the bubbles at the top of the tower. The balance of the spray which has been carried along with the gas is removed by the coke box or spray catcher. By thus removing all moisture carried over by mechanical means, the gas entering the mixing tower will contain only such moisture as the temperature of the gas will permit according to the degree of saturation at that temperature. By reducing the temperature of the gas below that specified a proportionate decrease in moisture will result, but the cost of operating at a lower temperature is not justified under ordinary operating conditions.

So far as I am aware the present process is the only successful continuous process for the manufacture of sulphuric acid from spent, waste or sludge acid where it has been possible to secure a concentration of sulphur dioxide above 50%. The value of this is at once apparent. Not only is it possible to reduce initial construction cost because of the smaller volume of gas handled through scrubber and cooler, but also to lower the cost of scrubbing and cooling the gas. Cooling costs are items of considerable importance when large volumes of gas are cooled, hence the advantage of producing a concentrated gas which can be reduced to the desired concentration of 7 to 8% after cooling and removing the major portion of the water.

What I claim is:

1. A continuous process for producing sulphur dioxide which comprises decomposing strong sulphuric acid in the presence of an excess of carbon by means of heat, withdrawing the liberated sulphur dioxide gas, continuously adding weak spent sulphuric acid of low carbon content derived from sludge and which has been separated from the original sludge, in a quantity just sufficient to compensate for the acid decomposed in the form of sulphur dioxide, and supplying additional carbon separate from the added acid in order to maintain the carbon excess at all times.

2. A continuous process for producing sulphur dioxide which comprises decomposing strong sulphuric acid in the presence of an excess of carbon by means of heat, withdrawing the liberated sulphur dioxide gas, continuously adding weak spent sulphuric acid of low carbon content derived from sludge and which has been separated from the original sludge, in a quantity just sufficient to compensate for the acid decomposed in the form of sulphur dioxide, supplying additional carbon separate from the added acid in order to maintain the carbon excess at all times, and maintaining a temperature of from 235° to 260° C. during the reaction.

3. A continuous process for producing sulphur dioxide with comprises decomposing strong sulphuric acid in the presence of an excess of carbon by means of heat, withdrawing the liberated sulphur dioxide gas, continuously adding weak spent sulphuric acid of low carbon content derived from sludge and which has been separated from the original sludge, in a quantity just sufficient to compensate for the acid decomposed in the form of sulphur dioxide, supplying additional carbon separate from the added acid in order to maintain the carbon excess at all times, and preheating the spent acids prior to the decomposition reaction.

4. A continuous process for producing sulphur dioxide which comprises decomposing strong sulphuric acid in the presence of an excess of carbon by means of heat, withdrawing the liberated sulphur dioxide gas, continuously adding weak spent sulphuric acid of low carbon content derived from sludge and which has been separated from the original sludge, in a quantity just sufficient to compensate for the acid decomposed in the form of sulphur dioxide, and supplying additional carbon separate from the added acid in order to maintain the carbon excess at all times, the molecular ratio of carbon to acid being maintained at not less than 1 to 2.

5. A process of decomposing separated sludge acid which comprises treating weak acid separated from the original sludge, by continuously adding said weak separated acid to a mixture of hot concentrated acid and carbon, and decomposing by means of heat in the presence of excess carbon, supplying additional carbon in order to maintain said excess at all times, the temperatures and the proportions of the reacting materials being such that all the sulphuric acid or sulphonic acid compounds contained in such acids will be liberated in the form of sulphur dioxide.

6. A continuous process which comprises heating strong sulphuric acid in the presence of a continuously maintained excess of carbon at a temperature sufficient to give off sulphur dioxide, withdrawing the sulphur dioxide and continuously adding weak spent sulphuric acid of low carbon content in a quantity just sufficient to compensate for the acid decomposed in the form of sulphur dioxide.

7. A process of decomposing spent sludge acid, which comprises continuously adding weak acid separated from the original sludge to a mixture of hot concentrated acid and carbon, heating the mixture in the presence of excess carbon, maintaining the temperatures and proportions of the reacting materials such that all sulphuric acid or compounds thereof will be decomposed to liberate sulphur dioxide, and withdrawing and purifying the sulphur dioxide.

WILLIAM MORRIS HIBBS.